United States Patent [19]

English et al.

[11] 4,081,291
[45] Mar. 28, 1978

[54] TEMPERATURE MEASUREMENT SENSOR

[75] Inventors: Paul Everitt English, Horsham; Ian Reginald Ashcroft, Purley, both of England; David Robert Bosher, Nairobi, Kenya

[73] Assignee: British Steel Corporation, London, England

[21] Appl. No.: 751,195

[22] Filed: Dec. 16, 1976

Related U.S. Application Data

[63] Continuation of Ser. No. 529,940, Dec. 12, 1974, abandoned.

[30] Foreign Application Priority Data

Dec. 21, 1973 United Kingdom .............. 59306/73

[51] Int. Cl.² ....................... H01L 35/02; G01K 7/00
[52] U.S. Cl. ..................................... 136/232; 73/341; 73/359 R
[58] Field of Search .................. 136/232; 73/341, 359

[56] References Cited

U.S. PATENT DOCUMENTS

| 2,054,120 | 9/1936 | De Florez | 136/232 |
| 3,417,617 | 12/1968 | Rall | 73/341 |
| 3,806,309 | 4/1974 | Laws et al. | 73/359 |
| 3,908,459 | 9/1975 | English et al. | 73/341 |

Primary Examiner—T.H. Tubbesing
Assistant Examiner—Richard E. Berger
Attorney, Agent, or Firm—Bacon & Thomas

[57] ABSTRACT

A temperature sensor for use in measuring the temperature of metal slabs in a reheating furnace is described. The sensor is located in close proximity to the undersurface of the slabs passing through the furnace and immediately below the level of the top of the slab supporting skids. The sensor comprises a metal housing having an open upper end and a metal disc welded to the housing within the opening; a first thermocouple being connected to the undersurface of the disc at its geometrical center and a second thermocouple being connected to the under-surface of the disc at a position displaced from the geometrical center but spaced inwardly from the housing.

4 Claims, 1 Drawing Figure

U.S. Patent  March 28, 1978  4,081,291
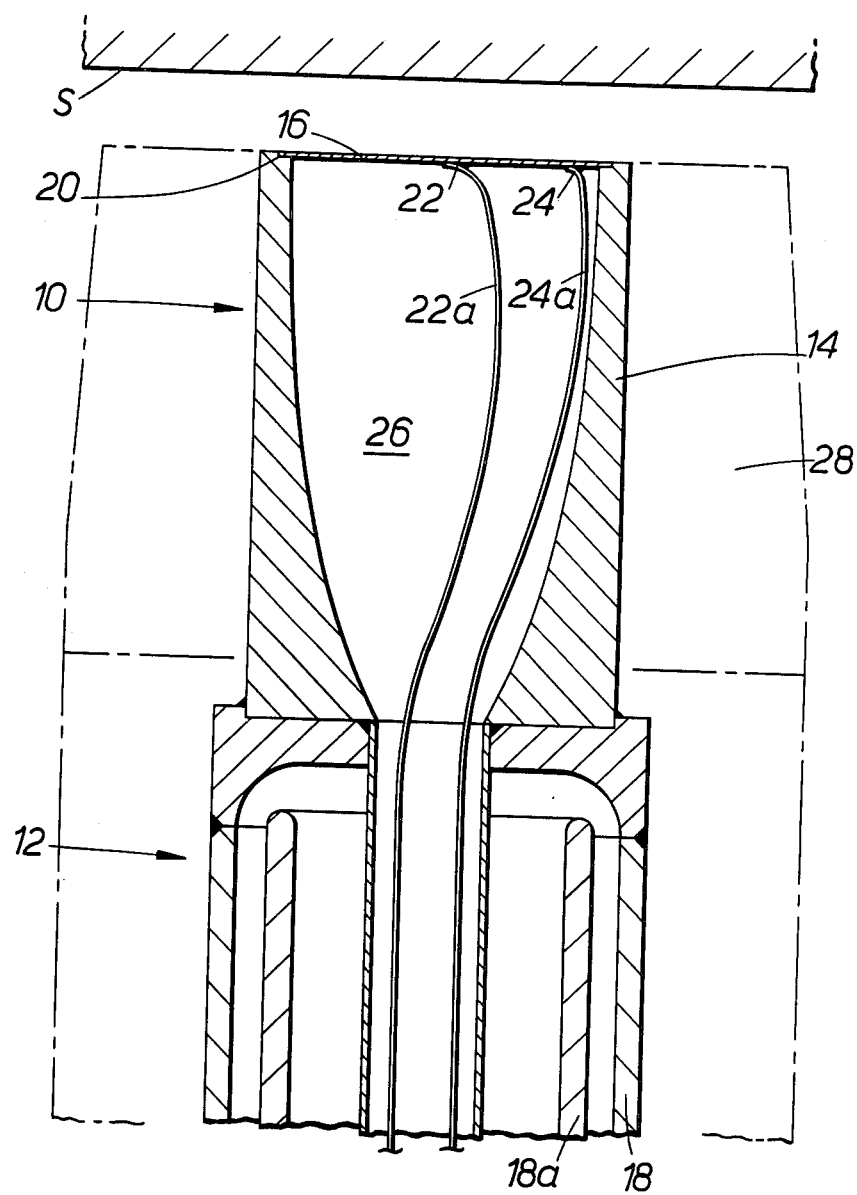

TEMPERATURE MEASUREMENT SENSOR

This is a continuation of application Ser. No. 529,940, filed Dec. 12, 1974, now abandoned.

This invention relates to a temperature sensing device which may be used, for example, in the measurement of slab temperature in a reheating furnace for steel slabs generally as set forth in U.S. Pat. No. 3,806,309.

In the aforesaid co-pending application there is described a steel slab reheating furnace including a plurality of temperature sensors located to be adjacent the under surfaces of the steel slabs as they pass through the furnace and wherein the sensors each comprise a thermocouple for obtaining a reading of the temperature of the under surfaces of the heated slabs.

It is an object of the present invention to provide an improved temperature sensor for use in high temperature surroundings for measuring the temperature of an article located in such surroundings and it is a particular, but not exclusive, object to provide an improved temperature sensor for use in the measurement of slab temperatures in a steel slab reheating furnace wherein the temperature may be of the order of 1300° C.

In accordance with one aspect of the present invention there is provided a temperature sensor comprising: a housing having an open upper end, a member providing an upwardly directed radiation receiving surface located within said housing and in thermal contact therewith, a first thermocouple connected to said member at substantially the geometrical centre thereof and a second thermocouple connected to said member at a position laterally displaced from said geometrical centre and spaced inwardly from said housing.

In accordance with a further aspect of the invention there is provided, in a metal slab reheating furnace comprising means for supporting metal slabs during their movement through the furnace, a plurality of heat sources located within the furnace, and at least one temperature sensor disposed at a level below the top of the supporting means; said sensor comprising a housing having an open upper end, a member providing an upwardly directed radiation receiving surface located within said housing and in thermal contact therewith, a first thermocouple connected to said member at substantially the geometrical centre thereof, and a second thermocouple connected to said member at a position laterally displaced from said geometrical centre, and spaced inwardly from said housing, the arrangement being that, in use, the radiation receiving surface of said member is disposed in close proximity to and facing the underside of a slab being heated with the furnace.

The housing is preferably of cylindrical configuration with said surface being defined by the outer facing surface of a metal disc secured in the open upper end of the housing and in thermal contact therewith around the periphery of the disc. The two thermocouples are secured to the under surface of the disc within the housing, with the said second thermocouple preferably being located closely adjacent the interior wall of the housing.

The disc is conveniently secured in the open upper end of the housing by welding and the whole of the interior of the housing below the disc, through which conveniently pass the thermocouple leads, is preferably filled with thermal insulating means.

The exterior of the housing is conveniently surrounded by thermal insulating material such as, for example, a refractory moulding, extending level with the said open end of the housing whereby the disc is substantially shieldable from ambient radiation and radiation may be received on the outer surface of the disc substantially solely from the object whose temperature is to be measured.

Other features of the invention will become apparent from the following description of one embodiment thereof given herein solely by way of example with reference to the accompanying drawing which shows a side cross-sectional view through a temperature sensor positioned in a metal slab reheating furnace.

The temperature sensor 10 described and illustrated herein is carried on appropriate water cooled mountings 12 for use in a reheating furnace for steel slabs S and includes a housing 14 providing support, at its upper end, for a temperature sensing element 16.

The housing 14 is of generally cylindrical exterior configuration and is preferably formed of a high cobalt steel internally profiled to provide a generally cup-shaped interior as illustrated. The housing 14 is provided with open ends and in use in a reheating furnace is disposed in the upright attitude illustrated having its lower end secured, as by welding, to the upper ends of co-axial tubes 18 – 18a forming the water cooled support system 12 which thus provides cooling to the base of housing 14. The open upper end of housing 14 is disposed closely adjacent the under surface of the metal slab S whose temperature is to be measured. As is known, the slabs S are passed through a reheating furnace on a supporting skid system (not illustrated) and the upper end of the housing 14 would be located slightly below the upper surfaces of the skids to avoid physical contact with the slabs S.

The open upper end of the housing 14 is provided with an annular shoulder 20 within which is received the temperature sensing element 16 in the form of a circular disc secured, as by welding, around its periphery to the housing 14 so as to be in good thermal contact therewith. The outer surface of the disc 16 is thus flush with the top of the housing 14 whilst the under surface of the disc has two sheathed thermocouples 22 and 24 intimately connected thereto. The first thermocouple 22 is connected at substantially the geometrical centre of the disc, whilst the second thermocouple 24 is laterally displaced therefrom and is preferably connected to the under surface of the disc at a position closely adjacent the interior side wall of the housing 14.

Respective thermocouple leads 22a – 24a extend downwardly through the interior of the housing 14 and through the tubed cooling support 12. The interior of the housing 14 is packed with a suitable thermal insulant 26, whilst the exterior of the housing 14 is surrounded by further thermal insulant conveniently in the form of a refractory moulding 28 of generally frusto-conical configuration, the upper surface of which is level with the upper end of the housing 14. The refractory moulding 28 thus shields the housing 14 and the sensing disc 16 from ambient radiation within the furnace whereby radiation may be received on the outer surface of the disc 16 substantially solely from the under surface of the slab S whose temperature is to be measured.

The principle of operation of the sensor 10 is such that radiation received from a hot slab S within the furnace will heat up the disc 16 whose temperature at its centre may be measured by the first thermocouple 22. Heat is conducted through the disc 16 to the wall of housing 14 which may be at either a higher or lower temperature than the centre of the disc 16. The temperature adjacent to the wall is measured by the second thermocouple 24. The thermal insulant material 26 within the interior of the housing 14 reduces any axial component of heat flow from the disc 16 to the water cooled support 12, and in an ideal condition, all heat flow from the disc would be in a radial direction. The temperatures measured respectively at the centre and the edge of the disc by the first and second thermocouples 22 – 24 may be utilised to derive a measured value of the surface temperature of a slab S passing over the sensor 10.

It will be appreciated, therefore, that the sensor 10 comprises the thin flat disc 16 supported by the cylindrical housing 14 and closely thermally coupled thereto around the periphery of the disc to act as a heat sink. Due to the thermal insulation 26 below the disc 10, all heat flow is substantially radial producing a temperature gradient between the centre and edge of the disc. Steep temperature gradients can exist, both at the disc support interface 20, and also within the housing itself. Therefore, the radial heat flow can only be accurately measured by measuring the temperature at the disc centre and at a point laterally displaced from the centre nearer to the heat sink. The position of the second measurement detected by the second thermocouple 24 is not absolutely critical, but for greatest sensitivity is as far away as possible from the first measurement point detected by the first thermocouple 22 but sufficiently removed from the wall of the housing 14 so as not to be influenced by any steep temperature gradient existing between the disc and the housing.

We claim:

1. In a metal slab reheating furnace comprising means for supporting metal slabs during their movement through the furnace and a plurality of heat sources located within the furnace; a refractory outer covering supporting at least one temperature sensor disposed at a level below the top of the supporting means, said sensor comprising a housing having an open upper end, a single thin metal disc providing an upwardly directed radiation receiving surface located within said housing and in thermal contact therewith round the priphery of the disc, the back of said disc being insulated against heat transfer therethrough, a first thermocouple connected to said disc at substantially the geometrical center thereof, and a second thermocouple connected to said disc at a position laterally displaced from said geometrical center and spaced inwardly from said housing, said housing providing a heat sink for heat conducted radially by said disc, there being a known and controlled heat conductive path between the centre of the disc and the housing, the arrangement being such that, in use, the radiation receiving surface of said disc is disposed in close proximity to and facing the underside of a slab being heated within the furnace and the temperature measured respectively by said first and said second thermocouple may be utilized to derive a measured value of the temperature of the radiation being received from said slab by said disc, said measured value being rapidly responsive to radiantly experienced changes in temperature of the slabs.

2. A temperature sensor as claimed in claim 1 wherein said disc is welded within the open upper end of the housing.

3. A temperature sensor as claimed in claim 1 wherein the interior of the housing below said member is filled with thermal insulating means.

4. A temperature sensor as claimed in claim 1 wherein the exterior of the housing is surrounded by thermally insulating material extending up to the open upper end of the housing, whereby the radiation receiving surface of said disc is substantially shieldable from ambient radiation, and radiation may be received on said surface substantially solely from the slab.

* * * * *